United States Patent Office 2,851,885
Patented Sept. 16, 1958

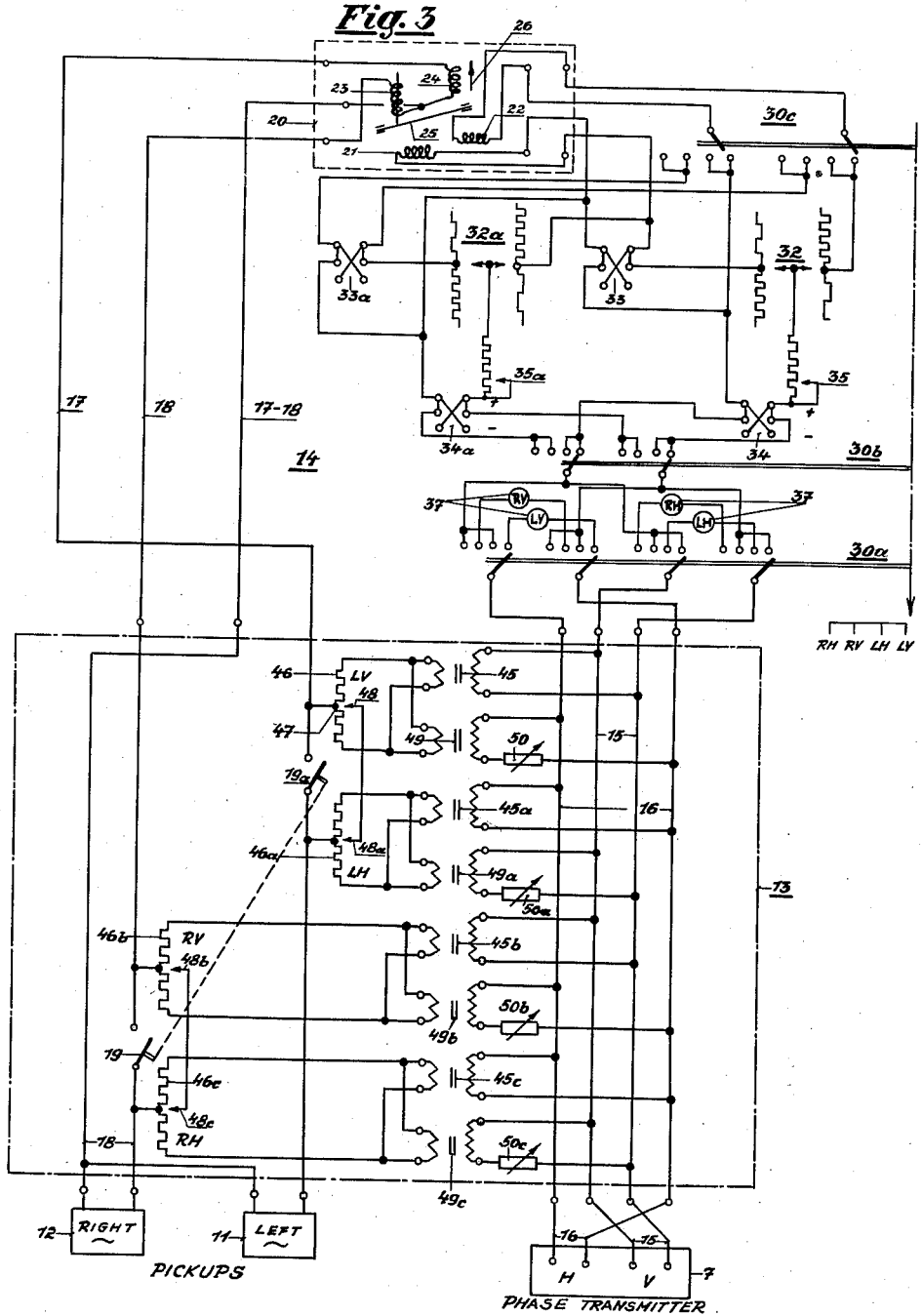

2,851,885

ADJUSTING DEVICES FOR ELECTRICALLY OPERATING BALANCING MACHINES

Klaus Federn, Darmstadt, and Heinz Haardt, Darmstadt-Eberstadt, Germany, assignors to Carl Schenck Maschinenfabrik G. m. b. H.

Application December 2, 1952, Serial No. 323,611

Claims priority, application Germany December 3, 1951

8 Claims. (Cl. 73—463)

Our invention relates to electrically operating balancing machines, particularly those for determining the unbalance of a revolving rotor relative to two radial correction planes.

The balance analyzing electric system of such machines is equipped with compensating means that are to be so adjusted that an unbalance in either correction plane does not enter into the unbalance indication for the other correction plane. Thus adjusted, the system indicates separately the mass correction needed in each of the two planes for obtaining a dynamic balance of the rotor being analyzed.

To afford a definite indication, however, such an analyzing system must first be calibrated. The calibration data are difficult to determine by calculation and, therefore, are usually obtained empirically either by operating the system with a perfectly balanced rotor to which artificial unbalance masses of known magnitude are added, or by using for calibration an unbalanced rotor and first adjusting the analyzing system in such a manner as to simulate a perfectly balanced rotor before the above-mentioned known artificial-unbalance masses are added.

Both calibrating methods leave much to be desired. The requirements for a perfectly balanced rotor is troublesome and expensive, especially in cases where individual rotors or only a few rotors of similar design are to be tested. The balance-simulating method, as heretofore known, requires rather complicated and space-demanding auxiliaries, such as the addition of compensating generators not serving any other purpose, or it introduces trouble-susceptible complication into the design of the unbalance-responsive oscillation pickups or their output circuits.

It is, therefore, one of the objects of our invention to provide a device for calibrating a balancing machine, or rather its balance-analyzing electric apparatus, that combines a comparatively simple design with a simpler possibility than heretofore available of rapidly effecting calibration by simulating a perfect balance of an actually unbalanced rotor.

Another object of our invention is to provide a device for storing the sequential indications of a balance-analyzing system so as to register the various unbalance values obtained for a complete measuring run, in order to then present all measuring results in a manner best suitable for guidance or control of the subsequent machining or fabricating operations needed for correcting the measured unbalance.

Still another object of our invention, subsidiary to either of the objects aforementioned, is to provide a device readily applicable as a supplementary accessory to existing balancing machines.

The foregoing and other objects and advantages of our invention, as well as the novel means for achieving such objects, will be apparent from, and will be mentioned in, the following description of the embodiments exemplified by the drawings, in which:

Fig. 3 is a complete circuit diagram of the electric components of the balancing machine shown in Fig. 1, involving the principle apparent from Fig. 2;

Figure 1:
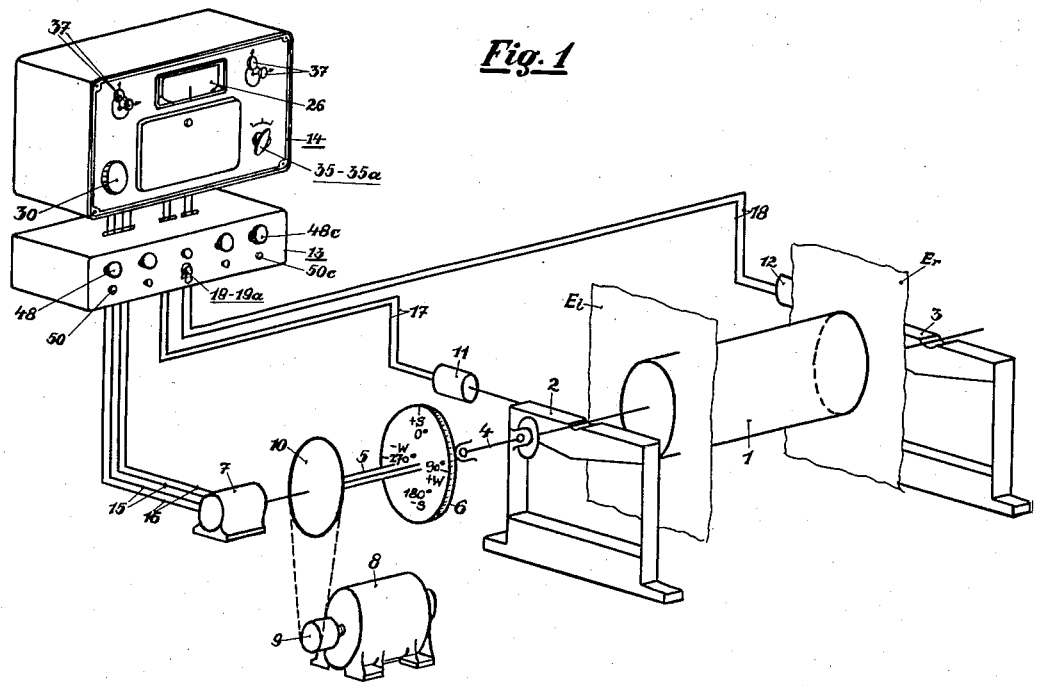
Fig. 1 is a schematic diagram of a balancing machine equipped with a device according to the invention.

According to Fig. 1, the rotor 1 to be balanced is journalled on bearing bridges 2 and 3 capable of oscillating within a substantially horizontal plane. The rotor is driven from a motor 8 through belt sheaves 9 and 10, a counter shaft 5, and a Cardanic shaft 4. A disc 6 with an angular division of 0° to 360° is mounted on shaft 5. A phase-reference transmitter 7 is coupled with shaft 5. Hence, disc 6 and transmitter 7 revolve in synchronism with the rotor and in a given angular relation thereto. The phase-transmitter 7 supplies two alternating currents phase-displaced from each other, for instance, by 90°. The transmitter 7 is shown as a sine-wave generator. However, other known types of phase-reference transmitters may also be used, such as commutators connected with a direct-current source or photoelectrically-controlled electronic oscillation generators. The horizontal oscillations of the bearing bridges 2 and 3 due to unbalance of the revolving rotor 1 are translated into alternating voltages by respective oscillation pickups 11 and 12. The pickups may have moving coils oscillating in the field of permanent magnets, although other types of electric pickups are also applicable.

The voltages from the oscillation pickups 11 and 12, as well as the currents from phase transmitter 7, are supplied to a balance-analyzing apparatus 14.

As shown in Fig. 1, the output leads 15, 16 of transmitter 7 and the output leads 17, 18 of pickups 11, 12 pass through an adjusting device 13 according to the present invention. This device has two jointly operable switch contacts 19, 19a (see also Fig. 3) which, when closed, render the device 13 ineffective so that then the pickup leads and reference-transmitter leads are through-connected to the balance-analyzing apparatus 14. It, therefore, will be convenient and proper to first describe the apparatus 14 in the assumption that device 13 is in its ineffective condition.

Before going into the details of the illustrated balance-analyzing apparatus 14, however, we want it to be understood that the particular design of the analyzing apparatus is not essential to the present invention and may correspond to any other known or previously proposed types involving pickup circuits and a phase-reference circuit. For instance, in one of the known analyzing apparatus, the pickup voltages are supplied through an adjustable potentiometric network and through an electronic amplifier to the moving coil of a wattmeter whose field coil receives excitation from a phase-reference generator. While such an apparatus may just as readily be used with the present invention, we have chosen to illustrate and describe the invention in conjunction with a wattmetric analyzing apparatus not requiring any potentiometer devices in the sensitive pickup circuits, more particularly, with a wattmetric analyzing system of the double-coil type as disclosed and separately claimed in the copending patent application Serial No. 226,589, filed may 16, 1951, of K. Federn for Methods and Apparatus for the Dynamic Balancing of Rotors, the copending application being assigned to the assignee of the present invention. This application is now Patent No. 2,706,399.

The illustrated analyzing apparatus 14 (Fig. 3) is equipped with a wattmeter 20 with two stationary field coils (current coils) 21, 22 and two moving coils (voltage coils) 23 and 24. The moving coils 23 and 24 are mounted on a spindle 25 which carries an indicating pointer 26 and is normally biased by spring force so that the pointer is in a midposition to indicate zero. Each of coil pairs 21, 23 and 22, 24 may be considered a separate wattmeter system capable of imposing its own component torque upon the spindle 25. Hence, the deflection of pointer 26 depends upon the resultant torque value. The setting of apparatus 14 may be such that, for instance, this resultant value is the difference of the two component torques.

Let us now look at one of the two component wattmeter systems, for instance, that comprises the coils 21 and 23. Such a system measures a vectorial product. That is, the deflection caused by the component torque depends upon the product of the respective currents flowing in the coils 21, 23 times the cosine of the angle between these currents, it being assumed, as is here the case, that both currents have the same frequency. When the current in field coil 21 is in phase, or exactly 180° out of phase, with the pickup current in coil 23, the cosine of the phase angle is unity so that the algebraic product of the two coil currents is measured. When the two currents are 90° or 270° out of phase, the cosine is zero and the measured product is likewise zero so that no torque and no deflection is produced. This applies analogously to the component wattmeter system comprising the coils 22 and 24.

As mentioned, two phase-reference currents from phase transmitter 7 are selectively available, one being 90° phase displaced relative to the other. When one of these currents is passing through the two wattmeter field coils 21 and 22, the wattmeter responds only to pickup currents in phase, or 180° out of phase, with this one phase-reference current. Consequently, depending upon which of the two phase-different reference currents is selected, the wattmeter indicates either only "vertical" unbalance components or only "horizontal" unbalance components.

For permitting a selection between "vertical" and "horizontal" indications and also a selection between the "right" and "left" correction planes $E_r$ and $E_l$ (Fig. 1) in which the unbalance components are to be measured, the apparatus 14 has a four-position switch 30 (Fig. 1) which, for convenience, is shown in Fig. 3 in three parts 30a, 30b, 30c, all joined together to be placeable into any one of four positions LV, LH, RV, and RH.

The switch 30 (30a, 30b, 30c), depending upon its selected position, connects one or the other of the lead pairs 15, 16, coming from the two terminal groups H and V of the phase-reference transmitter 7, with the wattmeter field coils 21 and 22. The connection extends in apparatus 14 through balance-adjusting rheostat devices 32 and 32a, and also through polarity reversing switches 33, 34 and 33a, 34a in series with sensitivity-adjusting rheostats 35 and 35a. The reversing switches 33, 33a and 34, 34a control the polarity of the current in coils 21, 22 for permitting a correction of unbalance either by addition or by removal of material as may be desired, or for changing the indication from plus to minus as may be required during the balance-analyzing procedure.

In the illustrated position LV (Fig. 3) of the fourposition switch, the just-mentioned circuit connection may be traced as follows. The right-hand lead 15 from transmitter 7 is connected by switch portions 30a, 30b and switch 34 through rheostat 35 to the tap points of rheostat device 32. From these tap points, the circuit has one branch extending through switch portions 30c and wattmeter field coil 22 and back through switches 30c, 34, 30b, 30a to the left-hand lead 15. Another circuit branch extends from the tap of rheostat device 32 through switch 33 to wattmeter coil 21 and thence back through switches 33, 34, 30b, 30a to the same lefthand lead 15. It will be noted that the two field coils 21 and 22 are parallel connected with each other and that the current flowing from the V terminals of transmitter 7 through each field coil can be varied relative to the current in the other coil by changing the tap setting of rheostat device 32. This circuit selection for indicating vertical unbalance in the left correction plane is indicated by one of four lamps 37, this particular lamp being denoted by LV in Fig. 3. The lamp LV is connected by switch portion 30a across the two leads 16 to be energized from the H terminals of transmitter 7.

Let us now assume that an unbalanced rotor is revolving in the balancing machine shown in Fig. 1, and that the balance measuring apparatus 14 as shown in Fig. 3 has its four-position switch set to the illustrated position LV for indicating the vertical unbalance component in the left correction plane $E_1$. Let us further still disregard the presence of the adjusting device 13 (i. e. assume that the switches 19 and 19a in Fig. 3 are both closed). Under these conditions, both pickups 11 and 12 will normally pass current through leads 17, 18 to the respective moving coils 23 and 24 so that the wattmeter will be subjected to two component torques and hence will respond to some resultant torque. That is, the wattmeter indication is normally a function of the horizontal unbalance component in the right correction plane as well as a function of the horizontal unbalance component in the left correction plane. It is, therefore, necessary to make a compensating adjustment for eliminating the horizontal unbalance in the left correction plane as regards its effect upon the wattmeter indication. To this end, the tap of compensating rheostat device 32 is to be placed into a position in which the component torque in the right system of coils 21, 23 is balanced by part of the torque in the left wattmeter system of coils 22, 24, or vice versa. With such an adjustment, the wattmeter indicates only vertical unbalance in the left correction plane.

With respect to the indication of the three other unbalance components (LH, RV, RH), the circuit settings and operating conditions are analogously similar, it being merely necessary to set the four-position switch into the particular position corresponding to the unbalance component to be measured at a time.

It will be apparent that if the indication of wattmeter 20 is to have a correctly interpretable meaning, the measuring apparatus 14 must first be given a proper calibration before an unbalance analysis can be carried out. The device 13 permits obtaining such a calibration in a rapid and reliable manner without requiring the use of a perfectly balanced rotor similar to those thereafter to be tested. For this purpose, the device 13 is used with a rotor of any unknown unbalance, for instance, one of the rotors to be balanced; and the device 13 is then adjusted to simulate, relative to the analyzing apparatus 14, the presence of a revolving rotor of perfect balance. This simulation is effected by superimposing from the phase-reference transmitter an electric effect upon the pickup circuits that opposes and balances the pickup response with respect to the analyzing apparatus. This may be done in two ways, namely on the principle of current superposition or on the principle of voltage superposition. The embodiment shown in Fig. 3 involves the principle of current superposition which will first be explained with reference to the schematic diagram of Fig. 2.

Figure 2:
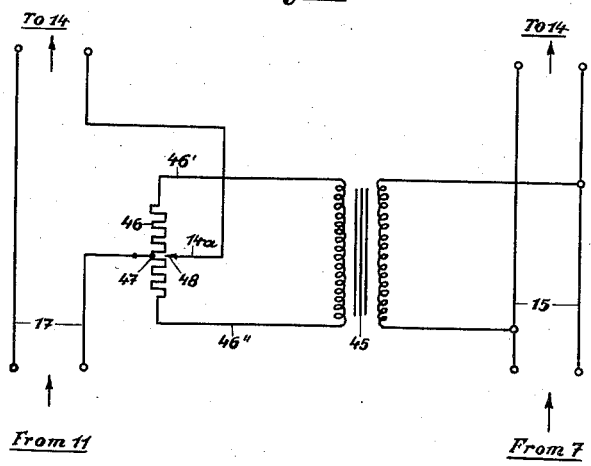
Fig. 2 is explanatory and shows a basic circuit diagram of an electrical part of the device according to the invention.

According to Fig. 2, a voltage, for instance of 25 volts, is tapped-off from the current flowing from phase transmitter 7 to measuring apparatus 14 and is supplied to a transformer 45 whose secondary energizes a resistor 46 of 20 ohms by a voltage of 2.5 volts. The resistor 46 has a fixed mid-tap 47 and a displaceable tap 48. One of the leads 17 coming from vibration pickup 11 is through-connected to measuring apparatus 14, while the mid-tap 47 and the displaceable tap 48 are interposed in the other lead 17. All numerical values presented above and below are used, of course, merely as convenient examples.

Due to the voltage of 2.5 volts on resistor 46, a resistor current of 125 milliamps results. The transformer 45, therefore, supplies a secondary power of about 0.3 watt, while its primary acts as a load on the phase transmitter but has a negligible influence in comparison with the consumption of 5 watts in the wattmeter itself. Depending upon the position of the displaceable tap 48, a voltage of up to 1.25 volts positive or negative can be switched into the pickup circuit 17. With a total impedance of the pickup circuit of about 250 ohms, including the pickup and the wattmeter moving coil, the voltage impressed on resistor 46 produces an additional current of 5 milliamps which suffices to counterbalance the current produced by the oscillation pickup even when the rotor unbalance has a relatively high value. Although the resistor 46, acting as an additional resistance in the measuring circuit of the wattmeter, produces a small error, this error is negligible because of the resistance proportion of 10 to 250 ohms.

Reverting now to Fig. 3, it will be seen that the device 13 is equipped with four transformer-resistor combinations of the type just explained. The elements in each of these combinations are denoted by the same respective reference numerals as in Fig. 2, except that affixes $a$, $b$ and $c$ are added to the elements of the second, third and fourth combinations respectively. Transformer 45, as in Fig. 2, connects the transmitter circuit 15 with the circuit 17 of pickup 11 to be applicable in the LV position of the four-position switch. Transformer 45$a$ connects the transmitter circuit 16 with the circuit 17 of pickup 11 to operate in the LH position. Transformer 45$b$ connects transmitter circuit 15 with circuit 18 of pickup 12 for operation in the RV position, and transformer 45$c$ connects circuit 15 with circuit 18 for operation in the RH position.

Each interconnection further includes a second transformer 49, 49$a$, 49$b$ or 49$c$ whose primary is connected in series with an adjustable resistor 50, 50$a$, 50$b$ or 50$c$, across the transmitter circuit carrying a 90° phase-displaced current relative to the current of the transmitter circuit connected to the transformer 45, 45$a$, 45$b$, 45$c$, respectively. The secondary of transformer 49 is parallel connected to the secondary of transformer 45, and the same parallel connection is applied to the three other pairs of transformer secondaries. The added transformers 49 to 49$c$ compensate for the frequency-dependent phase displacement occurring in the transformers 45 to 45$c$, thus making the accuracy of the device independent of the rotor speed.

With the illustrated setting of the four-position switch to the position LV, the "vertical" phase V of phase transmitter 7 is through-connected by leads 15 to the coils 21, 22 of instrument 20. In the secondary winding of transformer 45, however, this phase is angularly displaced by an amount depending upon the revolving speed of the balancing machine. Consequently the regulating resistor 46 would tend to introduce into the circuit of pickup 11 a current phase-displaced relative to the current flowing through the wattmeter field coils 21 and 22. In order to compensate such phase displacement, a small portion of the "horizontal" voltage of the phase transmitter is tapped off the resistance 50. The magnitude of the tapped-off voltage is dependent upon the setting of resistor 50 and is just as large as needed for establishing phase coincidence between the current introduced by resistor 46 into the circuit of pickup 11 and the current flowing in field coils 21, 22. The in-phase condition can readily be checked by switching the measuring apparatus 14 to "horizontal" measuring, whereafter a displacement of tap 48 of resistor 46 must not have any effect upon the indication of the instrument.

The same applies analogously to the regulating resistor 46$a$ with transformer 45$a$ and 49$a$. That is, the resistor 50$a$ is to be so adjusted that the current added by the potentiometer resistor 46$a$ to the circuit of pickup 11 has the same phase position as the current in field coils 21, 22 when the measuring apparatus 14 is set for "horizontal" measuring. The proper in-phase condition can be checked by switching the measuring apparatus 14 to the "vertical" phase, whereafter a displacement of tap 48$a$ of resistor 46$a$ is not supposed to have any effect upon the indication of the instrument. The taps 48 and 48$a$ can be displaced independently of each other. Any such displacement manifests itself by an instrument indication only when the measuring apparatus 14 has the proper setting. Changes in adjustment of any one of the four resistors have an effect upon the wattmeter indication only when the four-position switch is set to the one proper position.

The adjusting device 13 is further equipped with the aforementioned switches 19, 19$a$ which operate together and may form a part of a single switch unit (see Fig. 1). When switches 19, 19$a$ are closed, the device 13 is shorted out of the pickup circuits and hence ineffective.

When switches 19, 19$a$ are open as shown in Fig. 3, and with the four-position switch in position LV also as shown in Fig. 3, the tap 48 of resistor 46 can be shifted to a position where the left-vertical unbalance component ($L_V$) of a revolving rotor is just nullified as regards the instrument indication. As explained, the resistor 50 should be adjusted for the selected revolving speed of the rotor. This may be done beforehand by using a speed-indicating calibration on resistor 50. With resistor 50 thus preadjusted, the current jointly applied to the pickup circuit from the two transformers 45, 49 is exactly in phase with that coming from the pickup, and the displacement of tape 48 on resistor 46 does not influence the subsequent indication of the left-horizontal unbalance component ($L_H$) responded to by the same pickup 11 when the four-position switch is in position LH.

In an analogous manner, the resistors 45$a$, 45$b$, 45$c$ nullify the indication at the measuring device for the remaining components of unbalance, after previously regulating resistors 50$a$, 50$b$ and 50$c$ are correctly adjusted in accordance with the selected revolving speed of the rotor. Even when the regulating resistors 50 to 50$c$ are not accurately or not at all adjusted, the indication "zero" on measuring apparatus 14 can be obtained for all four measuring components in a simple manner by repeating several times the adjustment of resistors 46 to 46$c$, the repetition being then required to compensate mutual influences.

A complete calibration with the aid of the adjusting device 13 is carried out as follows.

After inserting a rotor 1 of unknown unbalance into the machine (Fig. 1), the rotor is driven at the selected revolving speed. Thereafter, both bearing bridges 2 and 3 are released for oscillation, and switches 19, 19$a$ are opened. The machinery is now ready for the first run (simulating run). Now the four-position switch is set, for instance, to position LV. The wattmeter 26 will now show some deflection indicative of an original unbalance of the rotor. The attendant then shifts the tap 48 of resistor 46 to a position in which the instrument deflection is reduced to zero. Thereafter, the same procedure is repeated for switch positions LH, RV, RH,; and each time the instrument deflection is zeroed by shifting the corresponding tap 48$a$, 48$b$ or 48$c$. Now the rotor, though actually unbalanced, has no effect upon the instrument indication regardless of the position to which the four-position switch may be set. That is, the device 13, as now set, has the effect of simulating a perfect balance of the rotor; and as long as the contacts 19, 19$a$ are open to make device 13 effective, all further calibrating adjustments can be made as if a balanced rotor was running.

After completion of the simulating run, the drive of the balancing machine is stopped. A calibrating weight of known magnitude is inserted on the rotor 1 in the left correction plane $E_l$ (Fig. 1), for instance, under 0° of the scale disc 6; and a second calibrating weight, also of known magnitude, is inserted in the right correction plane $E_r$ under 90° of the scale disc 6. Then the rotor is again set in revolution at the previous speed, and the machinery is now ready for a second run (calibrating run). The vibrations produced at the bearing bridges 2 and 3 are now due to the original unbalance plus the added calibrating weights. However, the measuring apparatus 14 can respond only to the effect of the calibrating weights. The measuring apparatus 14, therefore, can now simply be adjusted so that the calibrating weight inserted in the left correction plane does not show up in the indication for the right plane, while during the same run, because of its different angular position, the calibrating weight in the right correction plane can be made to have no effect upon the indication of unbalance in the left plane. These adjustments are made by operating the four-position switch and the rheostat devices 32, 32a in the manner described previously. In each selected position LV, LH, RV, RH of the four-position switch the wattmeter now shows a deflection denoting a definitely known amount of unbalance corresponding to the added calibrating weights. Consequently, the sensitivity control rheostats 35, 35a may now be set to make the wattmeter indication correspond to any desired ratio of calibrating weight to indication, so that the indication may read in centimeter gram per scale division, or in gram per scale division, or in millimeter drilling depth per scale division or the like units to be directly read off.

The measuring apparatus 14 is now completely calibrated and set for measuring operation. After stopping the rotor, the calibrating weights are removed and the machine is now started and ready for a third run (measuring run).

During the measuring run, the device 13 remains disconnected by closing the shorting switches 19, 19a. The four-position switch is now sequentially placed into its different positions and the wattmeter indicates each time the amount of actual unbalance in the desired measuring units. Any number of similar rotors, for instance, a whole series, may thereafter be tested for unbalance without repeating the simulating and calibrating runs.

The above-described simulating and calibrating procedures may be carried out very rapidly and, as apparent, the necessary device 13 does not require additional generators and occupies only very little space in comparison with what has heretofore been necessary for such purposes.

Figure 4:
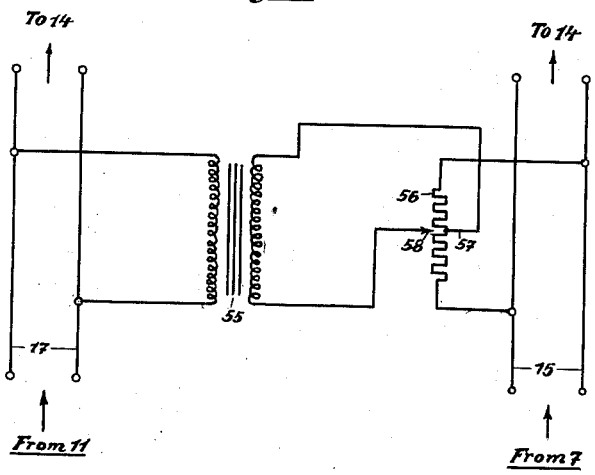
Fig. 4 shows a modification of the basic circuit diagram applicable, instead of the one represented in Fig. 2, with a machine and apparatus otherwise as shown in Figs. 1 and 3.

Instead of a connection for the superposition of currents in the pickup circuit, shown in principle by Fig. 2, a connection for the superposition of voltages according to Fig. 4 may be applied. According to Fig. 4, a voltage, for instance of 25 volts, is tapped off from the circuit 15 extending from phase transmitter 7 to the measuring apparatus 14. This voltage is impressed across a resistor 56 of 5000 ohms. This resistor 56 has a fixed mid-tap 57 and a displaceable tap 58. Depending upon the position of tap 58, a voltage of about 12 volts positive or negative can be placed upon the primary of a transformer 55. The transformer 55 is so rated that it supplies on its secondary side a voltage of about 0.5 volt maximum at a current intensity of about 10 milliamps. The secondary voltage is impressed upon the circuit 17 leading from pickup 11 to measuring apparatus 14 and is superimposed upon the voltage generated by the vibration pickup.

A basic circuit according to Fig. 4 may be used in adjusting devices otherwise designed and operative as explained with reference to Figs. 1 and 3.

Generally, the new device may be supplied as a supplementary accessory to electric balancing machines already existent, with the advantage that substantially no changes are needed on such equipment. In new balancing machines, the device may be built together with the indicating and analyzing devices, for instance within a common housing, to form a single unit. The circuit and construction of the new device further permit an exchange of old indicating apparatus for new ones that include the device according to the invention, without requiring changes in the structure of the balancing machine proper.

While the foregoing relates mainly to the use of the adjusting device according to the invention for calibrating a balance-analyzing apparatus by simulating a perfectly balanced rotor, the same device may also be used for a different purpose, namely for registering the results of the sequential balance-measuring operations so that the corresponding data are available for the subsequent balance-correcting machining operations. This other possibility of applying the adjusting device will be described presently.

As explained, after the balance-measuring apparatus 14 is properly calibrated and a rotor of unknown unbalance is being tested, the four-position switch is sequentially placed into its four positions; and in each of these positions one of the four unbalance components ($L_V$, $L_H$, $R_V$, $R_H$) is indicated by the pointer deflection of the wattmeter. During this measuring run, the device 13 remains inoperative, that is, the switches 19, 19a in Fig. 3 are normally closed.

Now, as soon as the attendant has placed the switch on the first position, for instance LV, and has observed the pointer deflection of the wattmeter, he opens the switches 19, 19a and then adjusts the tap 48 (or 58) of resistor 46 (or 56) until the instrument pointer is returned to zero. With the instrument thus zeroed, the adjustment of the rheostat tap 48 (or 58) is indicative of the magnitude of the unbalance component $L_V$. Thereafter the attendant closes the switches 19, 19a and places the four-position switch on the next position ($L_H$). The wattmeter then shows an indication, and the attendant displaces the slider rheostat 48a until that indication is zeroed. Then the setting of the tap on the rheostat 46a is indicative of the measured unbalance component ($L_H$). When the same procedure is carried out for the other two components, all four measured amounts are registered on the respective rheostats 46 to 46c so that the now conjointly available indications may be used for directing a machining operation. For instance, the rheostats may now serve for the control of a machine tool which automatically effects the balance correction. For this purpose, each of the four rheostats 46 to 46c may be designed as shown in Fig. 5 for rheostat 46.

Figure 5:
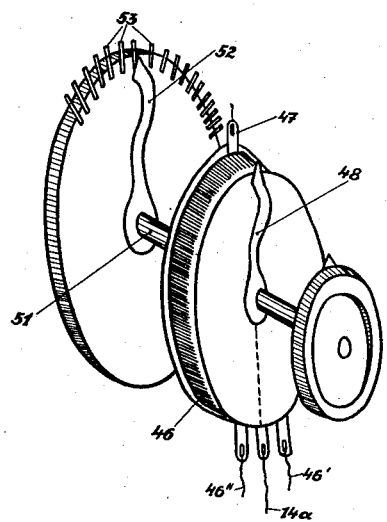
Fig. 5 is a perspective view of a modified rheostat and control unit applicable, for machine-tool control purposes, in apparatus otherwise as shown in the preceding figures.

To facilitate comparing the rheostat 46 in Fig. 5 with the same rheostat as shown in Figs. 2 and 3, three of the circuit leads connected to the rheostat are denoted in Fig. 5 by 14a, 46' and 46'', and these reference characters are also applied to the same respective leads in Fig. 2.

According to Fig. 5, the rheostat 46 is of circular shape and has its tap contact 48 mounted on a shaft 51 which carries a manually-operable knob and extends rearwardly beyond the rheostat resistor. A contact finger 52, mounted on the shaft extension, slides over stationary bank of contacts 53 when the pertaining rheostat tap contact 48 is being turned. The machine tool or tools to be controlled may be electrically connected with the contacts of bank 53 through the contact finger 52 to perform a mass-removing operation corresponding to the amount of the unbalance component to be compensated.

The circuits and auxiliary devices for effecting a machine tool control with the aid of the contacts 52 and 53 may be so designed, for instance, that they determine the drilling depth of balance-correcting drill presses in accordance with the one particular bank contact 53 engaged by the contact finger 52 when the rheostat is adjusted. The necessary control circuits are not essential to the invention, and therefore are not illustrated and described. However, if desired, reference may be had to the copending application of H. K. Hack, Serial No. 238,649, filed July 26, 1951, now Patent No. 2,810,307, for Balancing Method And Apparatus, assigned to the assignee of the present invention. The machine tool control according to the copending application is governed by the setting of selector switches, and the above-described device shown in Fig. 5 may serve as such a controlling selector switch.

It will be obvious to those skilled in the art upon a study of this disclosure that devices according to our invention may be modified as to design and component parts beyond the modifications specifically described, and may be used in combination with various balance-analyzing equipment other than specifically mentioned in the foregoing, all without departing from the essence of our invention and within the scope of the claims annexed hereto.

We claim:

1. With a balance analyzing system having drive means for revolving a rotor to be balance-analyzed, a phase-reference transmitter synchronous with the rotor revolution to provide a phase reference voltage, oscillation pickup means producing a pickup voltage responsive to unbalance vibration of the rotor, and an unbalance measuring apparatus for indicating the magnitude of rotor unbalance connected with pickup means and with said transmitter and responsive to a pickup-voltage component of a given phase relation to said reference voltage, the combination of an adjusting device comprising a first circuit connecting said transmitter to said apparatus, a second circuit connecting said pickup means to said apparatus, a transformer having a primary winding connected across said first circuit and having secondary terminals, a rheostat having a resistor connected across said secondary terminals and having on said resistor a fixed tap intermediate said terminals and a movable tap, said two taps being series connected in said second circuit.

2. A system for analyzing the unbalance of a rotor into two coordinate components for each of two radial correction planes, having two oscillation pickups in said respective planes for producing respective pickup voltages in response to unbalance vibrations of the rotor in said respective planes, a phase-reference transmitter with two reference circuits of mutually phase-displaced currents, and an unbalance measuring apparatus for selectively comparing each pickup voltage with each reference current to thereby indicate the amount of unbalance, in combination with an adjusting device comprising two pickup circuits connecting said respective pickups with said measuring apparatus, two reference circuits connecting said transmitter with said apparatus to supply said respective currents, and four coupling circuits of which two are connected between the same one of said two pickup circuits and said respective reference circuits while the other two coupling circuits are connected between the other pickup circuit and said respective reference circuits, each of said coupling circuits comprising a step-down transformer having a primary side connected with the pertaining reference circuit to be energized therefrom and having a secondary side connected with the pertaining pickup circuit to impress thereupon a voltage derived from said latter reference circuit, and each coupling circuit having an adjustable potentiometer rheostate interposed between said transformer and one of said pertaining reference and pickup circuits.

3. A system for analyzing the unbalance of a rotor into two coordinate components for each of two radial correction planes, having two oscillation pickups in said respective planes for producing respective pickup voltages in response to unbalance vibrations of the rotor in said respective planes, a phase-reference transmitter with two reference circuits of mutually phase-displaced currents, and an unbalance measuring apparatus for selectively comparing each pickup voltage with each reference current to thereby indicate the amount of unbalance, in combination with an adjusting device comprising two pickup circuits connecting said respective pickups with said measuring apparatus, two reference circuits connecting said transmitter with said apparatus to supply said respective currents, and four coupling circuits connecting said reference circuits with said pickup circuits, each of said coupling circuits comprising two transformers having respective primary sides connected across said respective reference circuits and having respective secondary sides both connected with one of said pickup circuits to supply it with an electric magnitude phased in opposition to the effect of the pickup voltage in said one pickup circuit, each of said coupling circuits having rheostate means connected with said transformers for varying said magnitude, two of said four coupling circuits being connected with the same pickup circuit and the other two coupling circuits being connected with said other pickup circuit.

4. In a device according to claim 3, each of said coupling circuits comprising a current control member connected with one of said two transformers for varying its output relative to that of the other transformer of the same coupling circuit to permit regulating the phase of said magnitude in accordance with the revolving frequency of the rotor.

5. With a balance analyzing system having a drive for revolving a rotor to be balance-analyzed, a phase-reference transmitter synchronous with the rotor revolution to provide a phase reference voltage, an oscillation pickup producing a pickup voltage responsive to unbalance vibration of the rotor, and an unbalance measuring apparatus connected with said pickup and with said transmitter and responsive to a pickup-voltage component of a given phase relation to said reference voltage for indicating the amounts of unbalance, the combination of an adjusting device for compensating the unbalance indication of said apparatus, said device comprising a first circuit connected to said transmitter and deriving reference phase current from said transmitter, a second circuit connecting said pickup to said apparatus, a transformer for imposing on said second circuit a vectorial electric quantity derived from said first circuit, said transformer having two windings of which one is connected across one of said two circuits, and a potentiometer having resistor means and contact means, said contact means comprising a fixed tap contact on said resistor means and a movable tap contact displaceable along said resistor means from one to the other side of said fixed tap contact, one of said resistor means and contact means respectively being connected across said other transformer winding, and the other means being connected to said other circuit, whereby said potentiometer permits varying said vectorial electric quantity and reversing its polarity.

6. In an adjusting device according to claim 5, said one winding of said transformer being connected across said second circuit, said resistor means being connected across said first circuit, and said contact means being connected across said other winding of said transformer.

7. With a balance analyzing system having drive means for revolving a rotor to be balance-analyzed, a phase-reference transmitter synchronous with the rotor revolution to provide a phase reference voltage, an oscillation pickup producing a pickup voltage responsive to unbalance vibration of the rotor, and an unbalance measuring apparatus connected with said pickup and with said transmitter and responsive to a pickup-voltage component of a given phase relation to said reference voltage for indicating the amounts of unbalance, the combination of an adjusting device for compensating the unbalance indication of said apparatus, said device comprising a first circuit connecting said phase-reference transmitter to said measuring apparatus, a second circuit connecting said pickup to said measuring apparatus, a transformer having a primary winding connected across said first circuit and having a secondary winding, circuit means connecting said secondary winding with said second circuit for imposing on said second circuit a vectorial electric quantity derived through said transformer from said first circuit, said circuit means comprising a potentiometer having a resistor connected across said secondary winding and having a tap displaceable along said resistor for providing a tapped-off resistor portion of selective resistance, said tapped-off portion being series connected in said second circuit for varying the amplitude of said electric quantity.

8. With a balance analyzing system having drive means for revolving a rotor to be balance-analyzed, a phase-reference transmitter synchronous with the rotor revolution to provide a phase reference voltage, oscillation pickup means producing a pickup voltage responsive to unbalance vibration of the rotor, and an unbalance measuring apparatus for indicating the magnitude of rotor unbalance connected with said pickup means and with said transmitter and responsive to a pickup-voltage component of a given phase relation to said reference voltage, the combination of an adjusting device comprising a first circuit for connecting the phase-reference transmitter to the measuring apparatus, a second circuit for connecting the pickup to the measuring apparatus, a resistor series connected in said second circuit, a transformer connected across said first circuit and having a secondary winding connected across said resistor, and a switch connected in said second circuit in shunt relation to said resistor for selectively rendering said device effective and ineffective.

References Cited in the file of this patent

UNITED STATES PATENTS

| 2,243,379 | Johnson | May 27, 1941 |
| 2,315,578 | Baker | Apr. 6, 1943 |

FOREIGN PATENTS

| 595,906 | Great Britain | Dec. 23, 1947 |